W. EDSON.
NUT LOCK.
APPLICATION FILED APR. 19, 1915.
1,165,955.
Patented Dec. 28, 1915.
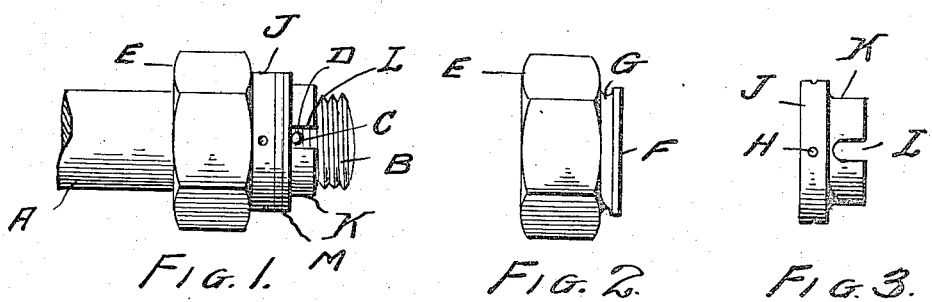
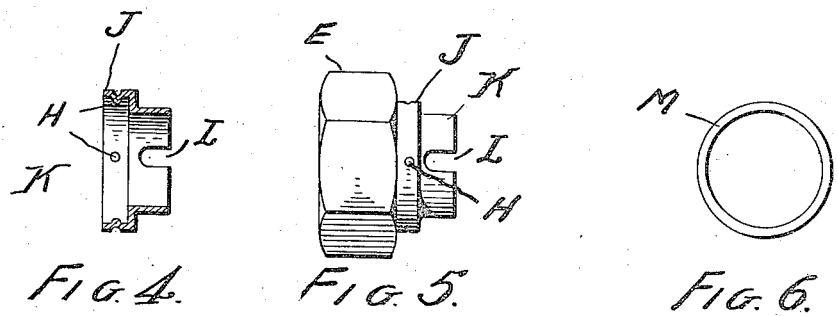
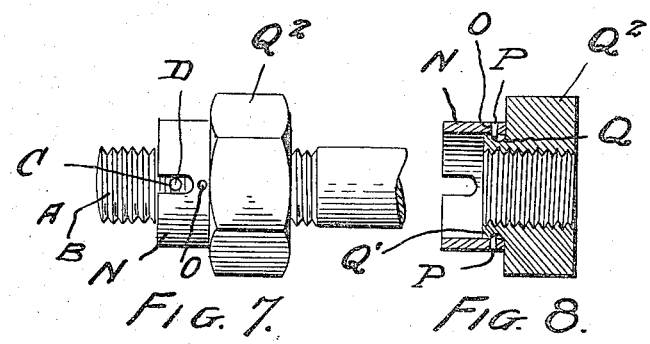
Witnesses
C. K. Davis
M. E. Moore
Inventor
WILLIAM EDSON
By 
Attorney

UNITED STATES PATENT OFFICE.

WILLIAM EDSON, OF NEW YORK, N. Y.

NUT-LOCK.

1,165,955. Specification of Letters Patent. Patented Dec. 28, 1915.

Application filed April 19, 1915. Serial No. 22,339.

*To all whom it may concern:*

Be it known that I, WILLIAM EDSON, a citizen of the United States, residing at New York, in the county of New York and State of New York, have invented certain new and useful Improvements in Nut-Locks, of which the following is a specification.

My invention relates to improvements in nut locks the object being the provision of a nut lock capable of use upon railroad rails, machinery, vehicle axles and generally for use in any situation where a simple, efficient and practical nut lock is desired.

Another object of my invention is the provision of a nut lock which can be instantly screwed home upon the bolt and which can be locked at the desired place upon the bolt instantly and which will absolutely retain the nut in locked position under the heaviest strain and usage.

Another object of my invention is the provision of a nut lock which will comprise few parts, which will be small and compact in size, and which can be produced at a very low price to make its use necessary and highly desirable.

With these objects in view, the invention broadly stated consists of a bolt having an opening in its threaded portion, a nut to fit said portion formed with a grooved collar, a locking sleeve fitting upon and traveling with the nut collar and formed with recesses adapted to aline with the opening in the threaded portion of the bolt, and a locking pin adapted to pass through the said opening of the bolt and be retained by the recesses in the collar of the nut.

The invention further consists of a nut lock embodying novel features of construction and combination of parts for service substantially as shown, described and particularly defined by the claims.

Figure 1 represents a side elevation of a nut lock constructed in accordance with and embodying my invention. Fig. 2 represents a side elevation of the nut, and Fig. 3 represents a side elevation of the locking sleeve member of my invention. Fig. 4 represents a sectional view of the locking sleeve member. Fig. 5 represents a side elevation of the nut and locking sleeve member in connected relation, and Fig. 6 represents a plan view of one of the rings or washers, used in adjusting my nut lock for certain kinds of service. Fig. 7 represents a side elevation of a slightly modified construction of my nut lock, and Fig. 8 represents a sectional view of the nut and locking sleeve member.

The nut lock is of extremely simple construction and, generally speaking, consists of a bolt A, having in its threaded portion B, an opening or aperture C, to receive a locking key or pin D, and upon the threaded portion is received the nut member E, formed at one side with the reduced collar F, having an annular exterior groove G, which groove receives the lugs or projections H, formed on the enlarged annular portion J, of the sleeve member K, formed with the recesses L, adapted to receive the locking key or pin D, to effect the locking of the nut and sleeve member upon the bolt.

It will thus be seen that the sleeve is screwed home upon the thread of the bolt with the nut, by which it is carried and that when screwed home, the sleeve can be turned or rotated to cause the recesses therein to aline with the opening in the threaded portion of the bolt, in which position the locking key or pin is passed through the opening into the path of said recesses and thus effects a positive locking of the nut upon the bolt. In some cases, a space is left between the enlarged portion of the sleeve and the locking pin, and in order to adjust the nut lock to this condition, I provide the washer or washers M, which fill in said space, as clearly shown in Fig. 1, and insure the proper locking of the nut upon the bolt.

In the form of my nut lock shown in Figs. 7 and 8, I use a cylindrical locking sleeve N, which is of the same diameter throughout, and provide the sleeve with a series of openings O, to receive pins P, which fit in the groove Q, of the collar Q', of the nut Q², in which construction the operation is identical with the other form of my improvement.

It will thus be seen that I provide a nut lock which will be capable of production at a low price, which can be used in any situation where a practical and reliable nut lock is required, and that the device can be adjusted and adapted to the service for which it is required, and that generally the nut lock will prove thoroughly efficient from every standpoint.

I claim:

1. In a nut lock, the combination with the threaded portion of the bolt having an opening therethrough, a nut mounted on said threaded portion and formed with an exteriorly grooved collar, a locking sleeve fitting said collar and having portions traveling in said grooved collar, and a locking pin for locking the collar upon the bolt.

2. In a nut lock, the combination with the threaded portion of the bolt having an opening therethrough, a nut mounted on said threaded portion and formed with an exteriorly grooved collar, a locking sleeve having means connecting it with said grooved collar and formed with recesses to aline with the opening of the bolt, a locking pin passing through the recesses and opening of the bolt, and washers adapted to be placed between the collar and locking pin to adjust the nut lock.

In testimony whereof I affix my signature in presence of two witnesses.

WILLIAM EDSON.

Witnesses:
F. B. HAUBERT,
M. COLEN.

Copies of this patent may be obtained for five cents each, by addressing the "Commissioner of Patents, Washington, D. C."